United States Patent Office 3,286,075
Patented Nov. 15, 1966

3,286,075
PROCESS OF WELDING A PRECIPITATION-HARDENABLE AUSTENITIC STEEL
Hans R. Kautz, Willich, and Horst Gerlach, Osterath, Lower Rhine, Germany, assignors to Gebr. Bohler & Co., Aktiengesellschaft, Vienna, Austria
No Drawing. Filed July 26, 1965, Ser. No. 474,953
Claims priority, application Germany, Aug. 4, 1964, B 77,968
1 Claim. (Cl. 219—137)

This invention relates to a process of welding a precipitation-hardenable, austenitic steel, which is alloyed with chromium, nickel and titanium, with a welding electrode having a basic calcium coating.

Austenitic steels which are selected for use in steam boilers, where plants are being erected which are expected to remain in operation for more than ten years and where the maximum working temperature is at present about 650° C., have substantially the same composition throughout the world. These austenitic steels contain about 17% chromium, 13% nickel, generally columbium for fixing the carbon, and optional admixtures of molybdenum, tungsten and vanadium.

These steels have been used for about twelve years and extensive experience is available concerning their properties, particularly their welding properties.

More recently, some highly stressed structural parts of steam power plants have been made for the first time from a steel which has a good high-temperature strength due to precipitation hardening and which constitutes a link to the presently usual nickel-base, high-temperature materials of the Nimonic type.

Steels of this kind have about the following composition: Up to 0.15% carbon, 0.6–1.5% silicon, 1–2% manganese, 12–17% chromium, 23–30% nickel, 0.6–3% molybdenum and/or 0.5–4% tungsten, 1–3% titanium, 0.03–0.3% aluminum, up to 1% vanadium, balance iron with inevitable impurities.

Concerning the welding of these steels, it has previously been reported that underseam cracks in the heat-modified zone of the base material are formed as well as cracks in the weld material itself. To avoid the latter, welds which are similar in kind are used only in exceptional cases. These cracks in the transition zone are caused by a fusion of the grain boundaries and segregation of a eutectic consisting of austenite and Fe$_2$Ti. This eutectic forms at temperatures above 1285° C. and coats the grain boundaries. Its action is aggravated by a coarse grain and by a deposition of carbidic and intermetallic substances on the grain boundaries during the cooling. Such cracks in the transition zone do not occur when the amount of melt available at the time when these cracks are formed is sufficient for filling the resulting crevices. This indicates that the matching of the melting ranges of the base material and weld material is of high significance.

Austenitic electrodes alloyed with chromium and nickel or non-precipitation hardenable nickel alloys are used as filler materials in welding this steel. It has frequently been reported, however, that there is a formation of cracks in the transition zone even when electrodes of a different kind are employed.

Thus, it is not possible to weld steels of this kind with electrodes of the same kind or of a different kind because cracks will form at least in the transition zone. It must also be borne in mind that the use of other austenitic electrode materials having a similar composition does not result in the required technological properties at room temperature.

The following properties of the steel must be taken into account for a successful welding of steels of the kind defined above:

(1) The steel can be precipitation-hardened owing to its high titanium content. This results in a very high hardness whereas the toughness properties are distinctly reduced.

(2) The precipitated phase comprises Ni$_3$(Al, Ti) (face-centered cubic) and results in the high increase in strength.

(3) Lamellar Ni$_3$Ti (hexagonal) occurs frequently at the grain boundaries and greatly reduces the toughness. As this effect is promoted by stresses, high stresses should be avoided as far as possible.

Electrodes used for welding this steel must meet the following requirements:

(1) The weld must have a high yield point and strength at room temperature.

(2) The long-time creep resistance up to 700° C. must be as good as or better than that of the steel.

(3) Heat treatments for precipitation-hardening the steel must necessarily be carried out after the welding and must not adversely affect the properties called for under (1) and (2) above.

(4) The melting range should be so matched to that of the steel that the contraction stresses are not restricted to the heat-modified zone of the base material.

In the literature, mainly non-precipitation-hardenable nickel alloys are taught as electrode materials but their strength properties at room temperature differ substantially from those of the steel.

It has now been found that the indicated disadvantages do not arise and the requirements called for are met when a precipitation-hardenable, austenitic steel consisting substantially of up to 0.15% carbon, 0.6–1.5% silicon, 1–2% manganese, 12–17% chromium, 23–30% nickel, 0.6–3% molybdenum in association with traces to 4% tungsten or 0.5–4% tungsten in association with traces to 3% molybdenum, 1–3% titanium, 0.03–0.3% aluminum, up to 1% vanadium, balance iron with inevitable impurities, is welded with an electrode which has a basic calcium coating and a core wire consisting of up to 0.15% carbon, 0.6–1.5% silicon, 1–2% manganese, 17–25% chromium, 8–12% nickel, 45–55% cobalt and 12–20% tungsten.

The use of these electrodes enables strength values to be attained which meet approximately the requirements called for in the base material.

It is believed that in this case too the melting ranges of the electrode and of the base material are so matched that a formation of cracks at the fused grain boundaries does not occur.

What is claimed is:

A process of welding a precipitation-hardenable, austenitic steel, which comprises welding a steel consisting substantially of traces to 0.15% carbon, 0.6–1.5% silicon, 1–2% manganese, 12–17% chromium, 23–30% nickel, a constituent selected from the class consisting of molybdenum usable in an amount of 0.6–3% in association with traces to 4% tungsten, and tungsten usable in an amount of 0.5–4% in association with traces to 3% molybdenum, 1–3% titanium, 0.03–0.3% aluminum, up to 1% vanadium, balance iron with inevitable impurities, with an electrode which has a basic calcium coating and a core wire consisting of traces to 0.15% carbon, 0.6–1.5% silicon, 1–2% manganese, 17–25% chromium, 8–12% nickel, 45–55% cobalt and 12–20% tungsten.

References Cited by the Examiner
UNITED STATES PATENTS
2,704,317  3/1955  Hummitzsch _____ 219—146

RICHARD M. WOOD, *Primary Examiner.*